United States Patent
Wang et al.

(10) Patent No.: US 12,017,488 B2
(45) Date of Patent: Jun. 25, 2024

(54) TIRE, WHEEL AND VEHICLE

(71) Applicant: Ninebot (Changzhou) Tech Co., Ltd, Suzhou (CN)

(72) Inventors: Weixiang Wang, Suzhou (CN); Xinjian Ji, Suzhou (CN); Tuo Jiang, Suzhou (CN)

(73) Assignee: NINEBOT (CHANGZHOU) TECH CO., LTD, Jiangsu (CN)

( * ) Notice: Subject to any disclaimer, the term of this patent is extended or adjusted under 35 U.S.C. 154(b) by 445 days.

(21) Appl. No.: 17/389,530

(22) Filed: Jul. 30, 2021

(65) Prior Publication Data

US 2022/0032687 A1 Feb. 3, 2022

(30) Foreign Application Priority Data

Aug. 3, 2020 (CN) .......................... 202021588045.2

(51) Int. Cl.
B60C 7/12 (2006.01)
(52) U.S. Cl.
CPC .................................... B60C 7/125 (2013.01)
(58) Field of Classification Search
CPC .. B60C 7/10; B60C 7/101; B60C 7/12; B60C 7/121; B60C 7/125
See application file for complete search history.

(56) References Cited

U.S. PATENT DOCUMENTS

| | | | | |
|---|---|---|---|---|
| 443,735 A | * | 12/1890 | Woodward | B60C 7/125 152/380 |
| 918,550 A | * | 4/1909 | Henderson | B60C 7/125 152/382 |
| 1,343,684 A | * | 6/1920 | Runyan | B60C 7/125 101/376 |
| 1,400,151 A | * | 12/1921 | Golein | B60C 7/06 152/251 |
| 1,472,903 A | | 11/1923 | Davis | |
| 4,345,633 A | | 8/1982 | Gilmore | |
| 4,436,128 A | * | 3/1984 | Pointer | B60C 7/125 152/380 |
| 5,168,910 A | * | 12/1992 | Zhang | B60C 7/125 152/328 |

FOREIGN PATENT DOCUMENTS

| | | |
|---|---|---|
| CN | 206678694 U | 11/2017 |
| CN | 211000778 U | 7/2020 |
| GB | 100381 A * | 2/1916 |

OTHER PUBLICATIONS

Extended European Search Report dated Oct. 25, 2021 for Application No. 21188532.2, 13 pages.

* cited by examiner

*Primary Examiner* — Kip T Kotter
(74) *Attorney, Agent, or Firm* — Frost Brown Todd LLP

(57) ABSTRACT

A tire, a wheel, and a vehicle are provided. The tire includes a tire body. The tire body has a plurality of cavities along the circumferential direction, each of the plurality of cavities has an opening located on an inner circumferential surface of the tire body, a connecting portion is formed between adjacent openings, the connecting portion comprises a middle connecting portion and an end connecting portion distributed along a width direction of the tire body, and a width of the middle connecting portion is constant.

19 Claims, 5 Drawing Sheets

TIRE, WHEEL AND VEHICLE

CROSS-REFERENCE TO RELATED APPLICATIONS

This application is based on and claims priority to Chinese Application No. 202021588045.2, filed on Aug. 3, 2020, the entire contents of which are incorporated herein by reference for all purposes.

FIELD

This application relates to the field of transportation tools, and more particularly to a tire, a wheel, and a vehicle.

BACKGROUND

Non-pneumatic tires, i.e., tires that do not need to be inflated, realize supporting and buffering functions merely by utilizing the material and structure of the tires per se, without the aid of air.

Some of existing non-pneumatic tires are purely solid rubber tires, resulting in poor experience and unsatisfactory damping effects, and some of them are axially perforated tires that may cause a bumpy feeling when riding due to the uneven amount of rubber compression deformation, resulting in low comfort of the tires, and severely degrading user experience.

SUMMARY

A first aspect of embodiments of the present disclosure provides a tire. The tire includes: a tire body, in which the tire body has a plurality of cavities along a circumferential direction, each of the plurality of cavities has an opening located on an inner circumferential surface of the tire body, a connecting portion is formed between adjacent openings, the connecting portion includes a middle connecting portion and an end connecting portion distributed along a width direction of the tire body, and a width of the middle connecting portion is constant.

A second aspect of the embodiments of the present disclosure provides a wheel, including a rim, a spoke, and a tire. The tire includes: a tire body, in which the tire body has a plurality of cavities along a circumferential direction, each of the plurality of cavities has an opening located on an inner circumferential surface of the tire body, a connecting portion is formed between adjacent openings, the connecting portion includes a middle connecting portion and an end connecting portion distributed along a width direction of the tire body, and a width of the middle connecting portion is constant.

A third aspect of the embodiments of the present disclosure provides a vehicle, including a vehicle body and a wheel. The wheel includes a rim, a spoke, and a tire. The tire includes: a tire body, in which the tire body has a plurality of cavities along a circumferential direction, each of the plurality of cavities has an opening located on an inner circumferential surface of the tire body, a connecting portion is formed between adjacent openings, the connecting portion includes a middle connecting portion and an end connecting portion distributed along a width direction of the tire body, and a width of the middle connecting portion is constant.

BRIEF DESCRIPTION OF THE DRAWINGS

In order to explain embodiments of the present disclosure or technical solutions in the related art more clearly, accompanying drawings used in the description of embodiments or the related art will be briefly introduced below. It is apparent that the accompanying drawings described below only illustrate some embodiments of the present disclosure. For those skilled in the art, other drawings can be obtained based on these drawings without creative efforts.

DETAILED DESCRIPTION OF EMBODIMENTS

Technical solutions in embodiments of the present disclosure will be clearly and thoroughly described with reference to the drawings in the embodiments of the present disclosure. Obviously, the described embodiments are only a part of the embodiments of the present disclosure, rather than all the embodiments. Based on the embodiments of the present disclosure, all other embodiments obtained by those skilled in the art without any creative efforts fall into the protection scope of the present disclosure.

The term "including" throughout the description and claims is an open-ended term, and should be interpreted as "including but not limited to". The term "substantially" means that within an acceptable error range, those skilled in the art can solve the technical problems within a certain error range and basically achieve the technical effects.

Furthermore, the term "connect" used herein encompasses any direct or indirect connection means. Hence, if a first device is described herein as being connected to a second device, it represents that the first device may be directly connected to the second device, or indirectly connected to the second device through other devices. Embodiments for implementing the present disclosure will be described later, but the description is for the purpose of illustrating general principles of the present disclosure and is not intended to limit the scope of the present disclosure. The protection scope of the present disclosure shall be determined by the appended claims.

It should be understood that the term "and/or" used herein merely describes a correlation of associated objects, and means that there may be three relationships. For example, A and/or B may represent three situations that A exists alone, A and B exist simultaneously, or B exists alone. In addition, the character "/" herein generally indicates that there is an "or" relationship between associated objects before and after the character "/".

Figure 1:
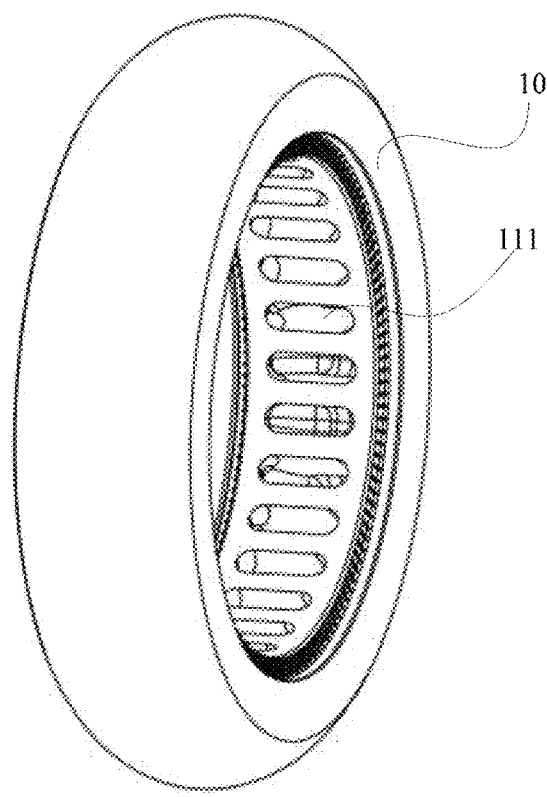
FIG. 1 is an axonometric view of a tire according to an embodiment of the present disclosure.
Figure 2A:
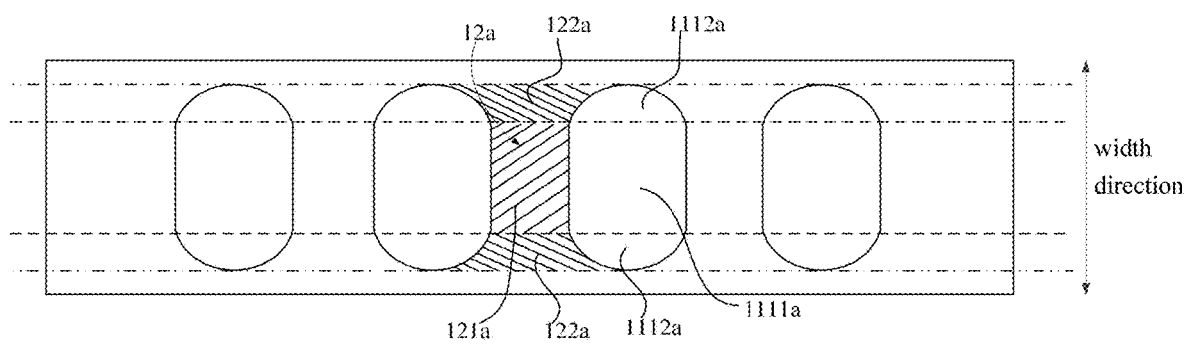
FIG. 2a is a schematic view showing a first partial layout of an opening of a tire according to an embodiment of the present disclosure.
Figure 5:
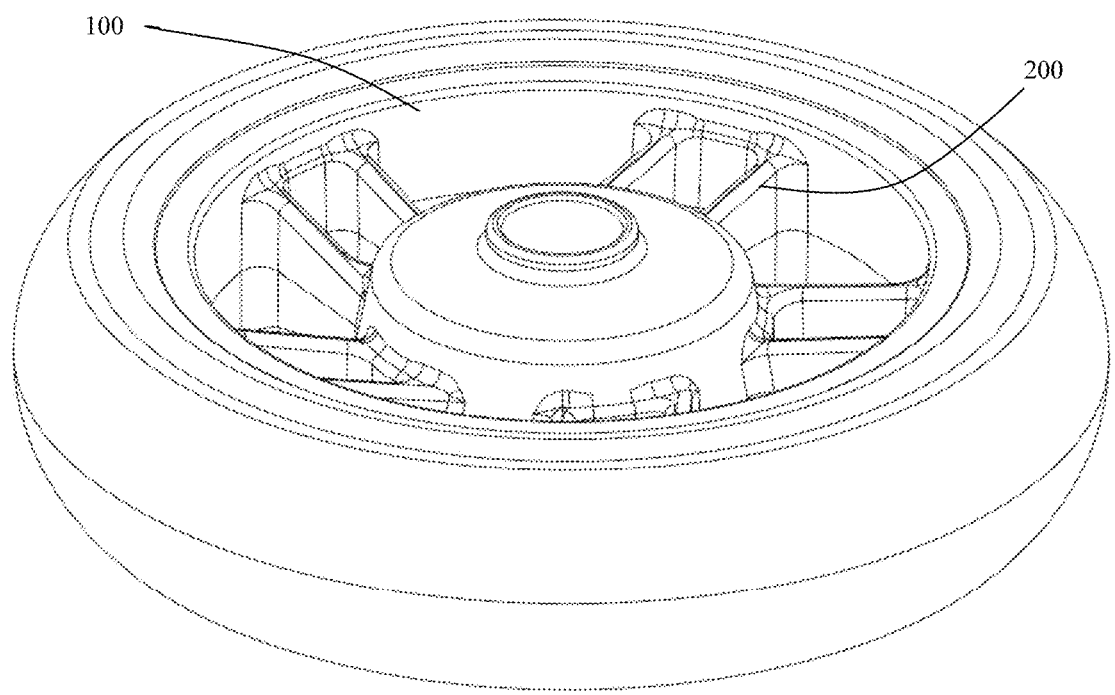
FIG. 5 is a perspective view of a wheel according to an embodiment of the present disclosure.

FIG. 1 is an axonometric view of a tire according to an embodiment of the present disclosure; and FIG. 2a is a schematic view showing a first partial layout of an opening of a tire according to an embodiment of the present disclosure. Referring to FIGS. 1, 2a and 5, a tire is provided to be fixed to a rim 100. The tire together with spokes 200 can form a wheel. The tire can be applied to any one of the following vehicles: a bicycle, an electric scooter, an electric self-balancing vehicle, an electric vehicle, an automobile, a go-kart, a drift vehicle, and the like. The tire includes a tire body 10.

The tire body 10 has a plurality of cavities 11 along a circumferential direction, and each cavity 11 has an opening 111 located in an inner circumferential surface of the tire body 10. A connecting portion 12a~12h (shown by hatching in FIGS. 2a-2h) is formed between adjacent openings 111, and the connecting portion 12a~12h includes a middle connecting portion 121a~121h and an end connecting portion 122a~122h distributed in a width direction of the tire body 10. The width of the middle connecting portion 121a~121h is equal everywhere.

It should be noted that the hatching shown in FIG. 2a merely exemplifies one connecting portion, and other connecting portions between adjacent openings 111 are not shown by hatching. The width of the middle connecting portion 121a~121h everywhere refers to the width of one middle connecting portion 121a~121h at each point along the width direction of the tire body 10.

In some embodiments, the connecting portion 12a~12h is formed between adjacent cavities 11.

Specifically, the tire body 10 is integrally made of a rubber member. The tire body 10 is wound to form the inner circumferential surface and an outer circumferential surface, the inner circumferential surface of the tire body 10 is fixed in the rim 100, and the outer circumferential surface of the tire body 10 is in rolling contact with the ground. The tire is in rolling contact with the ground during a driving process of a vehicle, and the outer circumferential surface of the tire body 10 can be provided with antiskid protrusions (which can be arranged in a pattern) or antiskid grooves, to increase friction between the tire and the ground, improve control performance of the vehicle, reduce noise of the tire, and enhance the driving comfort. Due to the arrangement of the antiskid protrusions or the antiskid grooves, a heat dissipating gap can be formed between the outer circumferential surface of the tire body 10 and the ground, to facilitate heat dissipation of the tire, reduce the probability of damage to the tire, and prolong the service life of the tire.

It should be noted that, during the driving process of the vehicle, a force exerted on the tire body 10 is directed from the outer circumferential surface of the tire body 10 toward the inner circumferential surface of the tire body 10 along a radial direction, and the tire body 10 is continuously compressed in this force direction, which generates compression deformation and then recovers the deformation.

In some embodiments, the cavities 11 and the openings 111 of the tire body 10 can be uniformly distributed along the circumferential direction of the tire body 10, such that the force exerted at each position can be balanced as far as possible in a rolling process of the tire body 10, and the damping effect at each position of the tire in the driving process of the vehicle is the same, effectively improving the comfort level, reducing the risk of partial wear and tear of the tire, and further prolonging the service life of the tire.

In some embodiments, a height of the connecting portion 12a~12h may be greater than a height of the tire body 10. Certainly, in some other embodiments, the height of the connecting portion 12a~12h may be equal to the height of the rest of the tire body 10. In addition, it can be understood that the wider and the thicker the connecting portion 12a~12h is, the greater the load it can bear, the better the rigidity of the entire tire body 10 is, but the weaker the buffering ability is. Those skilled in the art can design the connecting portion according to specific requirements, which will not be limited in the present disclosure.

In some embodiments, the connecting portion 12a~12h includes the middle connecting portion 121a~121h and the end connecting portion 122a~122h. As shown in FIG. 2a, two end connecting portions 122a may be located at both ends of the middle connecting portion 121a respectively, and areas of the two end connecting portions 122a may be or may not be equal. An area of the middle connecting portion 121a may be greater than the areas of the two end connecting portions 122a. The width of the middle connecting portion 121a is equal everywhere such that a width between adjacent openings 111 is substantially constant. In the driving process of the vehicle, the tire is subject to pressure from the ground, and the deformation of the connecting portion 12a between the adjacent openings 111 is substantially the same at each point, such that an effective and stable transition zone can be formed, making the driving smoother, and preventing a large partial deformation of the connecting portion 12a, which reduces the service life of the tire.

A ratio of the area of the middle connecting portion 121a~121h to the areas of the two end connecting portions 122a~122h is 3:1. It will be appreciated that when the width of the end connecting portion 122a~122h is not constant everywhere, the greater a ratio of the middle connecting portion 121a~121h to the connecting portion 12a~12h is, the more uniform the deformation of the connecting portion 12a~12h between adjacent openings 111 is. When the width of the end connecting portion 122a~122h is constant everywhere and is equal to the width of the middle connecting portion 121a~121h, a ratio of the middle connecting portion 121a~121h to the end connecting portion 122a~122h may be any ratio.

For the tire according to the embodiments of the present disclosure, the tire includes the tire body; the tire body has the plurality of cavities along the circumferential direction; each cavity has an opening in the inner circumferential surface of the tire body; the connecting portion is formed between adjacent openings; the connecting portion includes the middle connecting portion and the end connecting portions distributed along the width direction of the tire body, and the width of the middle connecting portion is constant everywhere. As a result, in the driving process of the vehicle, the amount of compression of the connecting portion between the openings is substantially constant everywhere, such that the shaking phenomenon of the vehicle in the driving process can be reduced to a certain extent, the overall damping effect of the tire can be effectively enhanced, the riding comfort can be improved, and the tire can have less abrasion, longer service life, and better endurance capability.

Figure 2B:
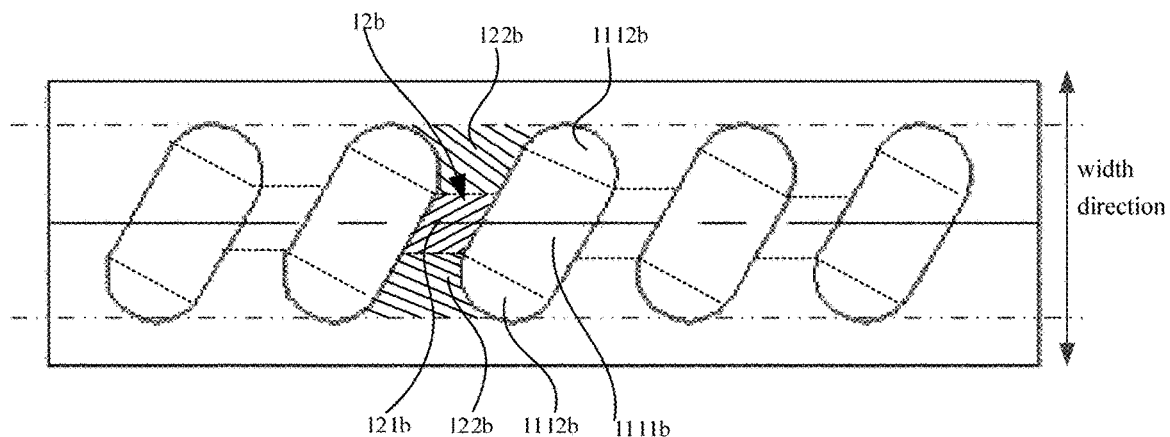
FIG. 2b is a schematic view showing a second partial layout of an opening of a tire according to an embodiment of the present disclosure.

The openings 111 shown in FIGS. 1 and 2a are runway-shaped (or capsule-shaped). A length direction of each runway-shaped opening 111 extends in the width direction of the tire body 10, and a width direction of the runway-shaped opening 111 extends in the circumferential direction of the tire body 10. FIG. 2b is a schematic view showing a second partial layout of an opening of a tire according to an embodiment of the present disclosure. As shown in FIG. 2b, in some other embodiments, the runway-shaped openings 111 may also be arranged obliquely.

Figure 2C:
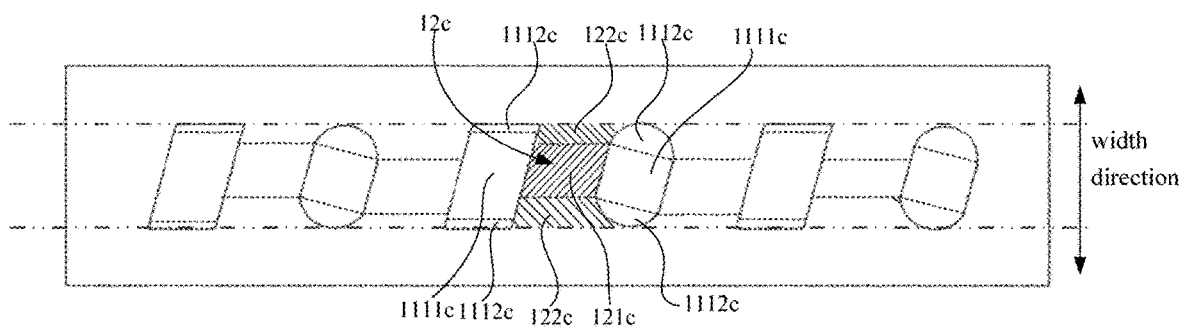
FIG. 2c is a schematic view showing a third partial layout of an opening of a tire according to an embodiment of the present disclosure.
Figure 2D:
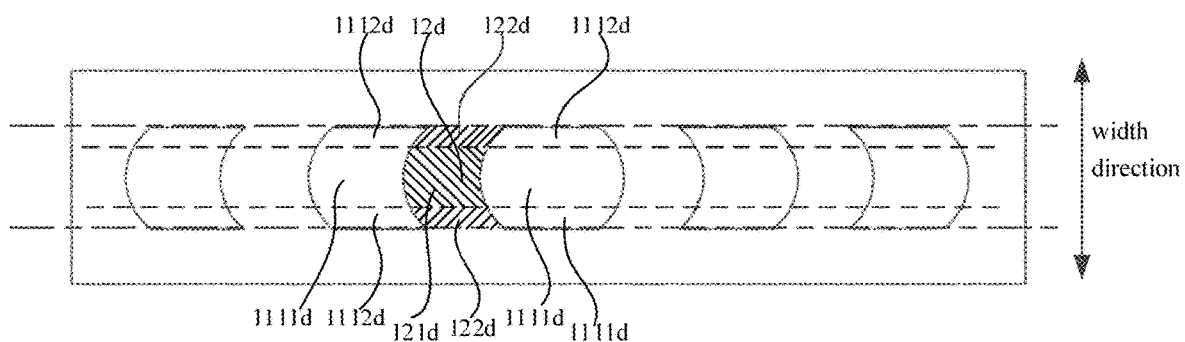
FIG. 2d is a schematic view showing a fourth partial layout of an opening of a tire according to an embodiment of the present disclosure.
Figure 2E:
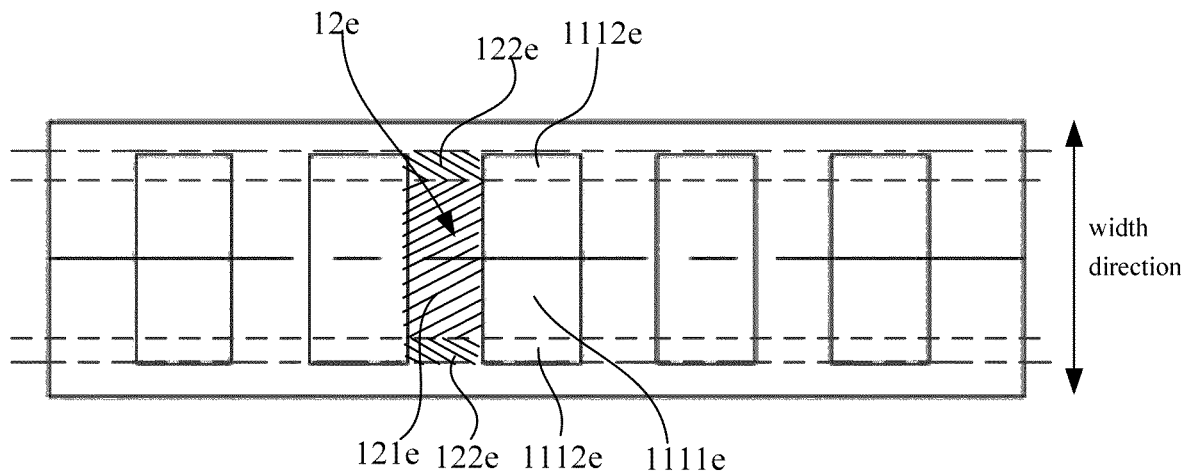
FIG. 2e is a schematic view showing a fifth partial layout of an opening of a tire according to an embodiment of the present disclosure.
Figure 2F:
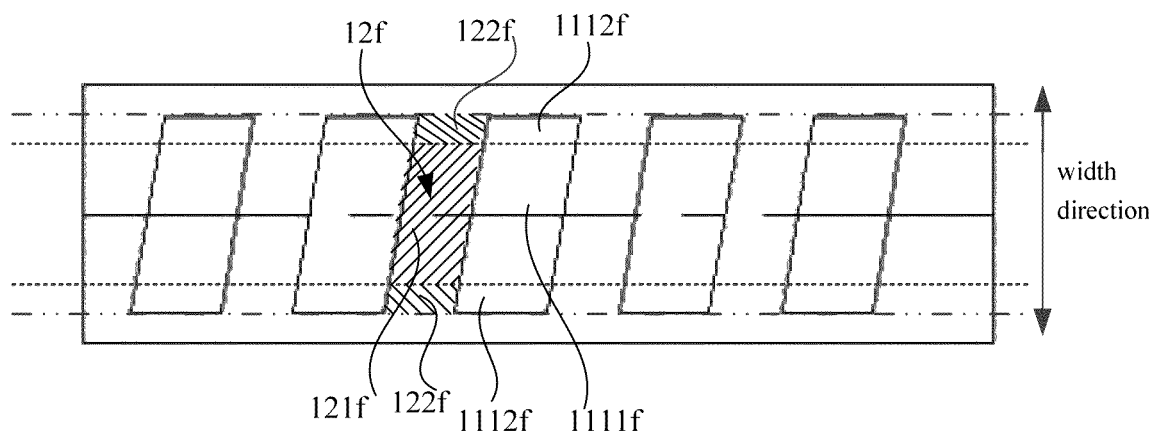
FIG. 2f is a schematic view showing a sixth partial layout of an opening of a tire according to an embodiment of the present disclosure.
Figure 2G:
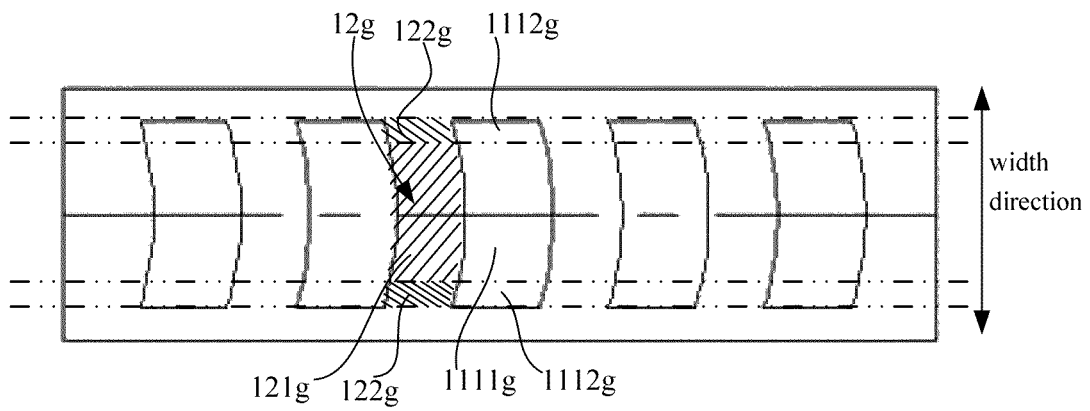
FIG. 2g is a schematic view showing a seventh partial layout of an opening of a tire according to an embodiment of the present disclosure.
Figure 2H:
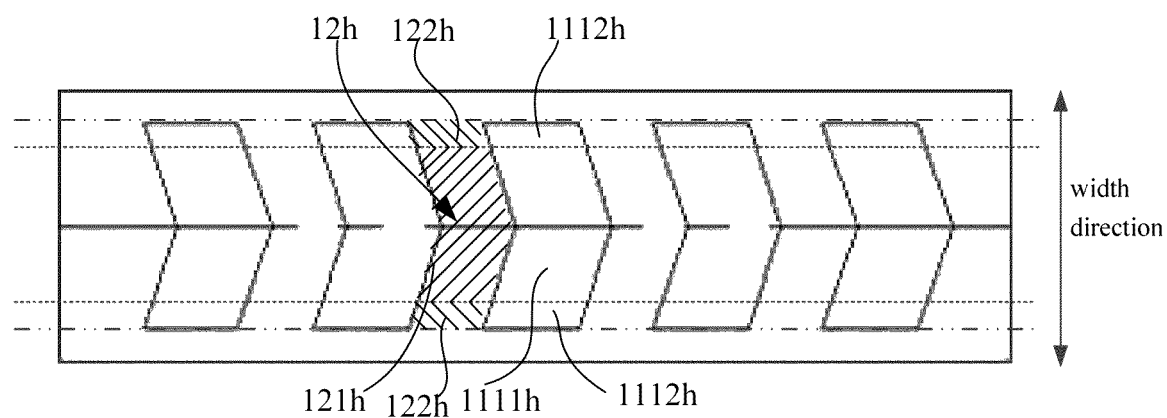
FIG. 2h is a schematic view showing an eighth partial layout of an opening of a tire according to an embodiment of the present disclosure.

FIG. 2c is a schematic view showing a third partial layout of an opening of a tire according to an embodiment of the present disclosure; FIG. 2d is a schematic view showing a fourth partial layout of an opening of a tire according to an embodiment of the present disclosure; FIG. 2e is a schematic view showing a fifth partial layout of an opening of a tire according to an embodiment of the present disclosure; FIG. 2f is a schematic view showing a sixth partial layout of an opening of a tire according to an embodiment of the present disclosure; FIG. 2g is a schematic view showing a seventh partial layout of an opening of a tire according to an embodiment of the present disclosure; FIG. 2h is a schematic view showing an eighth partial layout of an opening of a tire according to an embodiment of the present disclosure. The hatching in FIGS. 2b-2g illustrate only one connecting portion, and other connecting portions between adjacent openings 111 are not shown by hatching.

Referring to FIGS. 2a-2g, at least some openings 111 of the plurality of openings 111 in the tire body 10 according to the embodiments of the present disclosure have the same shape.

The openings 111 in the inner circumferential surface of the tire body 10 in the embodiments may include at least one of the following shapes: rectangle (as shown in FIG. 2e), square (not shown), parallelogram (as shown in 2f), regular runway-shape (as shown in FIG. 2a), oblique runway-shape (as shown in FIGS. 2b and 2c), sickle-shape (as shown in FIG. 2g), and V-shape (as shown in FIG. 2h), in which one set of opposite sides of the sickle-shape are straight lines and the other set of opposite sides thereof are arcs.

In some embodiments, as shown in FIG. 2a, FIG. 2b, FIG. 2e, FIG. 2f, FIG. 2g, and FIG. 2h, the plurality of openings 111 in the tire body 10 may have the same shape to facilitate processing and manufacturing at low cost. The shape of the connecting portion 12a~12h between adjacent openings 111 is also substantially the same, thereby ensuring that the tire is subject to balanced forces everywhere in the circumferential direction. When the shape of each opening 111 is the same, and the width of the connecting portions 12a~12h between adjacent openings 111 is also the same, the force exerted on the tire is most uniform such that a load bearing capacity of the tire is the same regardless of the position to which the tire is rotated, and the damping effect is the same, which relieves the bumping feeling and improves the comfort level in the driving process.

In some other embodiments, some openings 111 in the tire body 10 have the same shape, while one or more other openings 111 may have different shapes. As shown in FIG. 2c, the openings 111 in the tire body 10 include a parallelogram-shaped opening 111 and an oblique runway-shaped opening 111, and an inclination angle of the oblique runway-shaped opening 111 may be the same as an inclination angle of the parallelogram-shaped opening 111. Therefore, the width of at least the middle connecting portion 121c in the connecting portion 12c between adjacent openings 111 can be constant everywhere.

As shown in FIG. 2d, the openings 111 of the tire body 10 include a drum-shaped opening 111 and a plurality of sickle-shaped openings 111, and bending directions of the sickle-shaped openings 111 on both sides of the drum-shaped opening 111 may be opposite. It should be understood that there may be an X-shaped opening (not shown) having a radian matching a radian of the sickle-shaped opening on one side of the tire body 10 opposite to the drum-shaped opening, so that the widths of the connecting portions 12d in the circumferential direction of the entire tire body 10 are equal.

It will be appreciated that the two arrangements described above can also make the width of the middle connecting portion 121c or 121d between adjacent openings 111 equal everywhere; the width of the end connecting portion 122d or 122c may be constant everywhere (as shown in FIG. 2d) or may not be constant everywhere (as shown in FIG. 2c), and may be or may not be equal to the width of the middle connecting portion 121d or 121c.

In an embodiment shown in FIGS. 2a-2c, the width of the end connecting portion 122a~122c is not equal to that of the middle connecting portion 121a~121c. In the embodiment shown in FIGS. 2a-2c, the width of the end connecting portion 122a~122c is greater than that of the middle connecting portion 121a~121c. Certainly, in some other embodiments, the width of the end connecting portion may be less than that of the middle connecting portion.

Further, as shown in FIGS. 2a-2h, the opening 111 may include a middle portion 1111a~1111h and an end portion 1112a~1112h distributed in the width direction of the tire body 10. In some embodiments, a width of the middle portion 1111a~1111h is equal everywhere. Regarding selection of the shape of the opening 111, in some embodiments, the opening 111 has a shape in which the width of the middle portion 1111a~1111h is equal everywhere such that for a single opening 111, the deformation in the middle portion 1111a~1111h is equal, and the deformation in the end portion 1112a~1112h alone may be equal or not equal, resulting in substantially equal deformation everywhere for the single opening 111.

In some other embodiments, the width of the middle portion 1111a~1111h of each of the plurality of openings 111 of the entire tire body 10 may be constant everywhere, and the width of the middle portion 1111a~1111h of each of several other openings 111 may not be constant everywhere. For example, for the arrangement shown in FIG. 2d, the tire body 10 has one drum-shaped opening 111 and one X-shaped opening 111, and the widths of the middle portion 1111d and the end portions 1112d of the drum-shaped opening 111 are not constant everywhere, presenting a structure with a large middle part and two small ends. The widths of the middle portion 1111d and the end portions 1112d of X-shaped openings are not constant everywhere.

As shown in FIGS. 2e-2h, in some embodiments, the width of the end portion 1112e~1112h of the opening 111 is equal to the width of the middle portion 1111e~1111h, which can facilitate machine shaping, simplify mold design, and make the overall tire body 10 subjected to balanced force, with minimized abrasion in the driving process.

In some embodiments, as shown in FIGS. 2a-2b, the width of the end portion 1112a~1112b of the opening 111 is not equal to the width of the middle portion 1111a~1111b. In some embodiments, as shown in FIGS. 2c and 2d, the opening 111 having the width of the end portion 1112c~1112d equal to that of the middle portion 1111c~1111d together with the opening 111 having the width of the end portion 1112c~1112d not equal to that of the middle portion 1111c~1111d may be arranged on the tire body 10.

In any one of the above embodiments, the opening 111 may have an axisymmetric structure or a centrosymmetric structure symmetrically distributed in the width direction of the tire body 10. Further, in the width direction of the tire body 10, distances from two ends of the opening 111 to corresponding edges of the tire body 10 are equal. Therefore, the tire body 10 is subject to balanced force in a left-right direction, and the tire will not swing left and right in the driving process of the vehicle, ensuring the driving stability of the vehicle.

It should be noted that the shape and arrangement of the openings 111 described in the embodiment of the present disclosure are only exemplary, and those skilled in the art can also design other structural forms and arrangements according to specific circumstances, which will not be exemplified in the embodiments of the present disclosure, as long as the width of the middle connecting portion of the connecting portion between adjacent openings 111 is constant everywhere. It will be appreciated that the greater a range where the width of the connecting portion between adjacent openings 111 is constant is, the more uniform the deformation of the entire tire is, and the better the comfort level during driving is.

Figure 3:
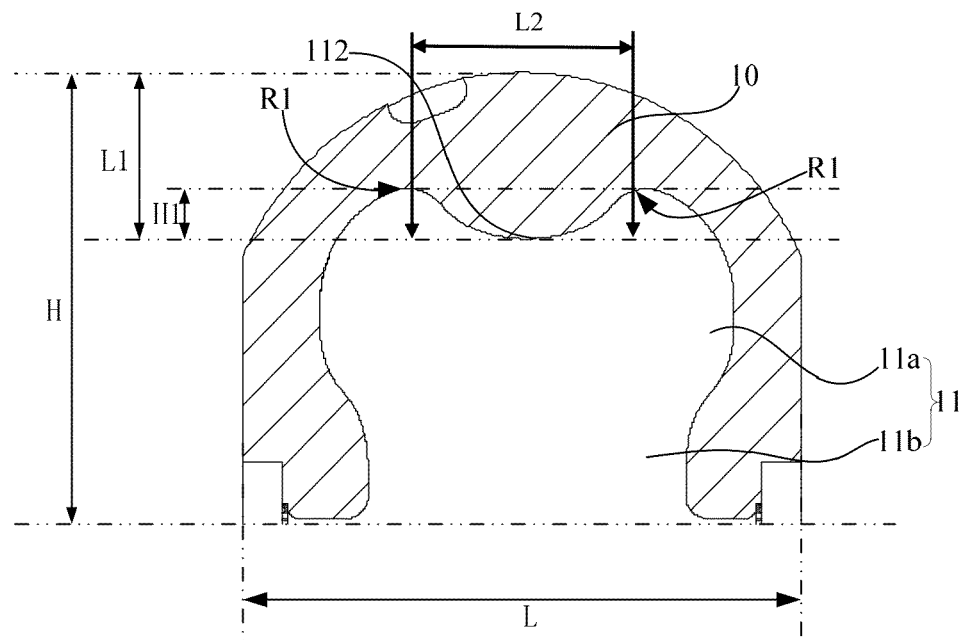
FIG. 3 is a cross-sectional view of a tire according to an embodiment of the present disclosure.

Further, based on the above-described embodiments, FIG. 3 is a cross-sectional view of a tire according to an embodiment of the present disclosure. As shown in FIG. 3, the cavity 11 of the tire in the embodiment may have a convex rib 112 at a top of the cavity and projecting toward the opening 111. It should be noted that the top of the cavity 11 described herein refers to a state shown in FIG. 3. That is, a convex rib 112 protruding toward the opening 111 is arranged on a cavity wall of the cavity 11 opposite to the opening 111. The convex rib 112 extends in the circumferential direction of the tire body.

It should be noted that regardless of the shape of the opening 111, the design of the inner structure of the cavity 11 will not be affected. Those skilled in the art can arrange a convex rib 112 in the cavity 11 according to a reasonable structural layout design. Through the above special design in terms of the shape and arrangement of the opening 111 and in cooperation with the design of the convex rib 112 in the cavity 11, the comfort of the tire and the endurance capability of the entire vehicle can be improved to the maximum extent.

Further, each corner of the opening 111 of the cavity 11 may exhibit an arc transition, avoiding a problem of tearing at the corners of the opening 111 when the tire body 10 is compressed and deformed, and prolonging the overall service life of the tire body 10 effectively.

In the driving process of the vehicle, when the tire body 10 made of rubber is compressed and deformed, the top of the cavity 11 of the tire body 10 is most significantly compressed and deformed. In order to make the deformation of the entire cavity wall of the cavity 11 as uniform as possible, the convex rib 112 is arranged on the top of the cavity 11 of the tire body 10, so that a height of the top of the cavity 11 is increased by the convex rib 112, and the anti-pressure ability of the top of the cavity 11 is enhanced, making the compression deformation at the top of the cavity 11 and compression deformation at a side portion of the cavity 11 as uniform as possible.

For the tire according to the embodiment, since the convex rib 112 is arranged in the middle of the top of the cavity 11 of the tire body 10, the height of the top of the tire body 10 is increased, and the overall supporting performance of the tire body 10 can be improved, effectively reducing a risk of tire separation. Moreover, in the driving process of the vehicle, a contact area between a top of the outer circumferential surface of the tire body 10 and the ground can be reduced, such that rolling resistance between the tire body 10 and the ground can be effectively reduced, making the driving of the vehicle smoother.

For the tire according to the embodiment, the convex rib protruding towards the opening is arranged at the top of the cavity, such that when the tire is subjected to force, the deformation at the top of the cavity in the force direction is reduced, and the compression deformation throughout the tire is effectively balanced, making the compression deformation as uniform as possible, and relieving the shaking phenomenon of the vehicle in the driving process to a certain extent, to effectively improve the entire damping effect of the tire and the user experience.

In an example, a cross section of the convex rib 112 may be semi-elliptical. As shown in FIG. 3, in another example, the cross section of the convex rib 112 includes a first arc segment, a second arc segment, and a third arc segment. The first arc segment and the third arc segment are recessed inward with respect to the convex rib 112, and the second arc segment protrudes outward with respect to the convex rib 112. The first arc segment is smoothly transitioned and connected to a first end of the second arc segment, and a second end of the second arc segment is smoothly transitioned and connected to the third arc segment. Due to a smooth and uniform surface of an outer contour of the convex rib 112, an outer surface of the convex rib 112 can be uniformly deformed everywhere during the use of the tire body 10, avoiding fractures caused by excessive partial deformation, and ensuring the service life of the tire. In addition, the convex rib 112 has the largest height in its middle portion, and the height of the convex rib 112 gradually decreases to zero from the middle portion to both sides such that the compression deformation throughout the tire body 10 can be as uniform as possible.

Based on the above embodiments, the cavity wall of the cavity 11 may have an arc shape everywhere such that the cavity wall of the cavity 11 is smooth, the force transmission throughout the tire body 10 is gentle, and the driving stability of the vehicle is ensured.

With regard to the design of the specific structural dimensions of the convex rib 112, the inventors have conducted a number of experimental tests to determine that when the convex rib 112 adopts the following parameters, the tire body 10 can have the best damping effect, and the rolling resistance between the tire body 10 and the ground is small, on the premise of ensuring the supporting performance of the tire body 10.

Specifically, as shown in FIG. 3, a distance L1 from a top of the convex rib 112 to the outer circumferential surface of the tire body 10 is ¼ to ½ of a height H of a cross section of the tire body 10. In some embodiments, the distance L1 from the top of the convex rib 112 to the outer circumferential surface of the tire body 10 is ⅓ of the height H of the cross section of the tire body 10. A height H1 of the convex rib 112 is ¹⁄₁₆ to ¼ of the height H of the cross section of the tire body 10. In some embodiments, the height H1 of the convex rib 112 is ⅛ of the height H of the cross section of the tire body 10. The height of the convex rib 112 is moderate to ensure the elastic buffering performance of the tire body 10 while ensuring the supporting performance of the tire body 10. A width L2 of the convex rib 112 can be ¼ to ¾ of a width L of the tire body 10. In some embodiments, the width L2 of the convex rib 112 can be ½ of the width L of the tire body 10. The width of the convex rib 112 is moderate to ensure the supporting performance of the tire body 10, and realize a purpose of making the compression deformation uniform throughout the tire body 10.

Figure 4:
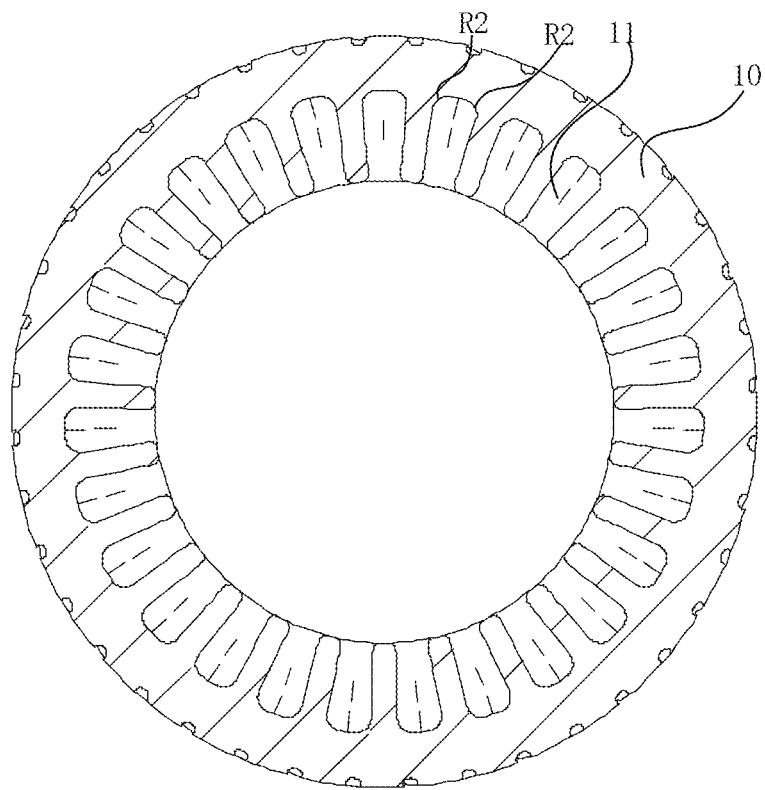
FIG. 4 is a longitudinal sectional view of a tire according to an embodiment of the present disclosure.

FIG. 4 is a longitudinal sectional view of a tire according to an embodiment of the present disclosure. As shown in FIGS. 3 and 4, a corner between the convex rib 112 and the cavity wall of the cavity 11 can be a round corner transition (as indicated by R1 in FIG. 3), which can further effectively ensure a smooth transition from a middle portion of the cavity wall of the cavity 11 of the tire body 10 to both sides of the cavity wall, and avoiding sudden loss of supporting performance due to inconsistency in the compression deformation of the rubber of the tire body 10. In addition, the round corner transition between the convex rib 112 and the cavity wall of the cavity 11 makes the force transmission gentler, and avoids stress concentration between the convex rib 112 and the cavity wall of the cavity 11 due to an abrupt change of the compression deformation at the corner, effectively ensuring the service life of the tire body 10. Through effective measurement and calculation, when the structure design of the convex rib 112 is adopted, the rolling resistance of the entire tire body 10 can be reduced by ten percent, and the driving stability and smoothness of the vehicle can be improved.

Further, as shown in FIG. 4, the corner includes a first corner R1 corresponding to a cross section of the cavity 11, and/or a second corner R2 corresponding to a longitudinal section of the cavity 11; the second corner R2 is tangent to the cavity wall and/or the second corner R2 is tangent to the top of the convex rib 112.

More specifically, as shown in FIG. 3, the cavity 11 includes a first cavity body 11a and a second cavity body 11b; a part of the tire body 10 corresponding to the second cavity body 11b is used to be fixed to the rim 100 (as shown in FIG. 5); and a width of the first cavity body 11a is greater than a width of the second cavity body 11b. A cavity wall of the rest of the first cavity body 11a except for the convex rib 112 is an arc surface protruding outwardly. As shown in FIG. 3, a longitudinal section of the first cavity body 11a may be substantially rectangular. The convex rib 112 at a top of the first cavity body 11a protrudes toward the opening 111, and the cavity wall of the rest of the first cavity body 11a except for the convex rib 112 is the arc surface protruding outwardly, such that the tire body 10 is easily compressed and deformed to ensure an elastic buffering effect of the tire body 10.

In the first cavity body 11a, the thickness of the cavity wall at positions other than the convex rib 112 is constant. In the first cavity body 11a, except that an outer surface of the tire body 10 corresponding to the middle convex rib 112 is in contact with the ground, the outer surface of the tire body 10 at other positions do not need to be in contact with the ground. The compression deformation at other positions is transmitted from a middle position of the tire body 10. The thicknesses of the cavity wall at other positions except for the convex rib 112 being constant can ensure that the compression deformation at other positions is substantially the same.

Further, in some embodiments, the thickness of the cavity wall of the second cavity body 11b may be greater than the thickness of the cavity wall of the first cavity body 11a at other positions except for the convex rib 112. Since a part of the tire body 10 at a position corresponding to the second cavity body 11b is used for fixed contact with the rim 100—specifically the part of the tire body 10 at the position corresponding to the second cavity body 11b can be snapped into the rim 100, an appropriate increase in the thickness of the cavity wall of the second cavity body 11b can make fixation between the part of the tire body 10 corresponding to the second cavity body 11b and the rim 100 more reliable due to the fact that the second cavity body 11b is fixed with the rim 100, and avoid a phenomenon that the part of the tire body 10 is separated from the rim 100 in the process of elastic deformation of the tire body 10 due to a small thickness of the part of the tire body 10, improving the driving safety of the vehicle effectively.

The part of the tire body 10 corresponding to the second cavity body 11b can be snapped into the rim 100, and the tire body 10 can be in interference fit with the rim 100. In some other embodiments, the tire body 10 and the rim 100 can also be fixed through snaps or by bonding, which will not be limited in the embodiment and can be specifically designed by those skilled in the art in the light of requirements.

Embodiments also provide a wheel that includes a rim 100, a spoke 200, and a tire as provided in any one of the above embodiments.

The structure and function of the tire in the wheel are the same as those of the tire in the above embodiments, and reference can be made to the description of the above embodiments, which will not be repeated.

Embodiments also provide a vehicle that can include any one of the following: a bicycle, an electric scooter, an electric self-balancing vehicle, an electric vehicle, an automobile, a go-kart, a drift vehicle, and the like. Specifically, the vehicle includes a vehicle body, and wheels according to any one of the above embodiments.

The structure and function of tires used by the vehicle are the same as those of the tire in the above embodiments, and reference can be made to the description of the above embodiments, which will not be repeated in the embodiment.

Various embodiments or examples, as well as features of various embodiments or examples described in the specification can be incorporated and combined by those skilled in the art in case of no contradiction.

Finally, it should be noted that the above embodiments are merely used to illustrate the technical solutions of the present disclosure, rather than limit the present disclosure. Although the present disclosure has been described in detail with reference to the foregoing embodiments, those skilled in the art should understand that the technical solutions recited in the above embodiments can be modified, or some of the technical features can be replaced with equivalents. These modifications or replacements do not cause the essence of the corresponding technical solutions to depart from the scope of the technical solutions of the embodiments of the present disclosure.

What is claimed is:

1. A tire comprising a tire body,
wherein the tire body has a plurality of cavities along a circumferential direction, each of the plurality of cavities has an opening located on an inner circumferential surface of the tire body, a connecting portion is formed between adjacent openings, the connecting portion comprises a middle connecting portion and an end connecting portion distributed along a width direction of the tire body, and a width of the middle connecting portion is constant,
wherein a convex rib is arranged on a cavity wall of each of the plurality of cavities opposite to the corresponding opening, and protrudes toward its opening and extends along the circumferential direction of the tire body; and a distance L1 from a top of the convex rib to an outer circumferential surface of the tire body is ¼ to ½ of a height H of a cross section of the tire body.

2. The tire according to claim 1, wherein a width of the end connecting portion is equal to the width of the middle connecting portion, or the width of the end connecting portion is not equal to the width of the middle connecting portion.

3. The tire according to claim 1, wherein the opening comprises a middle portion and an end portion distributed in the width direction of the tire body, a width of the middle portion being constant.

4. The tire according to claim 3, wherein a width of the end portion is equal to the width of the middle portion, or the width of the end portion is not equal to the width of the middle portion.

5. The tire according to claim 1, wherein distances from both ends of the opening to corresponding edges of the tire body are equal in the width direction of the tire body.

6. The tire according to claim 5, wherein the opening has a centrosymmetric structure, or the opening has an axisymmetric structure symmetrically distributed in the width direction of the tire body.

7. The tire according to claim 1, wherein at least some of the plurality of openings in the tire body have a same shape.

8. The tire according to claim 7, wherein each of the plurality of openings in the tire body has the same shape.

9. The tire according to claim 8, wherein the plurality of openings are uniformly distributed in the circumferential direction of the tire body.

10. The tire according to claim 1, wherein a width of the end connecting portion is greater than the width of the middle connecting portion.

11. The tire according to claim 1, wherein shapes of the plurality of openings comprise at least one of: rectangle, square, parallelogram, regular runway-shape, oblique runway-shape, sickle-shape, and V-shape,
wherein the sickle-shape comprises two sets of opposite sides, one set of opposite sides being straight lines and the other set of opposite sides being arcs.

12. The tire according to claim 1, wherein a ratio of an area of the middle connecting portion to areas of two end connecting portions is 3:1.

13. The tire according to claim 1, wherein a surface of the convex rib is an arc surface.

14. The tire according to claim 1, wherein a cross section of the convex rib comprises a first arc segment, a second arc segment, and a third arc segment; the first arc segment and the third arc segment are recessed inward with respect to the convex rib, and the second arc segment protrudes outward with respect to the convex rib; the first arc segment is smoothly transitioned and connected to a first end of the second arc segment, and a second end of the second arc segment transitioned and connected to the third arc segment.

15. The tire according to claim 1, wherein a corner between the convex rib and a cavity wall of the cavity is a round corner transition.

16. The tire according to claim 15, wherein the corner comprises at least one of a first corner and a second corner, the first corner being corresponding to a cross section of the cavity, and the second corner being corresponding to a longitudinal section of the cavity;
the second corner is tangent to at least one of the cavity wall and a top of the convex rib.

17. The tire according to claim 1, wherein a cavity wall of the cavity has an arc shape.

18. A wheel, comprising:
a rim;
a spoke; and
a tire comprising a tire body,
wherein the tire body has a plurality of cavities along a circumferential direction, each of the plurality of cavities has an opening located on an inner circumferential surface of the tire body, a connecting portion is formed between adjacent openings, the connecting portion comprises a middle connecting portion and an end connecting portion distributed along a width direction of the tire body, and a width of the middle connecting portion is constant;
a convex rib is arranged on a cavity wall of each of the plurality of cavities opposite to the corresponding opening, and protrudes toward its opening and extends along the circumferential direction of the tire body; and
a distance L1 from a top of the convex rib to an outer circumferential surface of the tire body is ¼ to ½ of a height H of a cross section of the tire body.

19. A vehicle, comprising:
a vehicle body; and
a wheel comprising:
a rim;
a spoke; and
a tire comprising a tire body,
wherein the tire body has a plurality of cavities along a circumferential direction, each of the plurality of cavities has an opening located on an inner circumferential surface of the tire body, a connecting portion is formed between adjacent openings, the connecting portion comprises a middle connecting portion and an end connecting portion distributed along a width direction of the tire body, and a width of the middle connecting portion is constant;
a convex rib is arranged on a cavity wall of each of the plurality of cavities opposite to the corresponding opening, and protrudes toward its opening and extends along the circumferential direction of the tire body; and
a distance L1 from a top of the convex rib to an outer circumferential surface of the tire body is ¼ to ½ of a height H of a cross section of the tire body.

* * * * *